United States Patent
Cheng

(10) Patent No.: US 7,334,401 B2
(45) Date of Patent: Feb. 26, 2008

(54) APPARATUS FOR SENSING PARTICULATES IN A GAS FLOW STREAM

(75) Inventor: Shi-Wai S. Cheng, Troy, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 205 days.

(21) Appl. No.: 11/335,221

(22) Filed: Jan. 19, 2006

(65) Prior Publication Data
US 2007/0163233 A1 Jul. 19, 2007

(51) Int. Cl.
*F01N 3/00* (2006.01)
(52) U.S. Cl. ............................ 60/297; 60/274; 60/276; 60/295; 60/303; 73/23.34; 73/28.02; 204/421; 204/424
(58) Field of Classification Search ................ 60/274, 60/276, 287, 291, 295, 297, 303; 73/23.33, 73/23.34, 28.01, 28.02; 204/421, 424, 426
See application file for complete search history.

(56) References Cited

U.S. PATENT DOCUMENTS

| 4,300,990 | A * | 11/1981 | Maurer ......................... 204/412 |
| 4,567,750 | A * | 2/1986 | Artmann ........................ 73/23.33 |
| 4,656,832 | A * | 4/1987 | Yukihisa et al. ............... 60/303 |
| 6,634,210 | B1 * | 10/2003 | Bosch et al. .................. 73/23.33 |
| 6,971,258 | B2 * | 12/2005 | Rhodes et al. ............... 73/28.01 |
| 2002/0064649 | A1 | 5/2002 | Lembke ........................ 428/336 |

* cited by examiner

*Primary Examiner*—Binh Q. Tran

(57) ABSTRACT

A particulate sensor for sensing the presence of particulates in a gas flow stream is disclosed. The particulate sensor includes a housing having a flow divider to provide a first flow path and a second flow path. A heater is disposed and configured to provide uniform heating of the two flow paths. A first temperature sensor is disposed in the first flow path downstream of the heater. A second temperature sensor is disposed in the second flow path downstream of the heater. A fine filter is disposed within the second flow path and is configured to trap carbonaceous particulates.

15 Claims, 6 Drawing Sheets

APPARATUS FOR SENSING PARTICULATES IN A GAS FLOW STREAM

BACKGROUND OF THE INVENTION

The present disclosure relates generally to exhaust systems, and particularly to an apparatus for sensing particulates in a gas flow stream of a diesel exhaust system.

Diesel exhaust systems typically employ a diesel particulate filter (DPF) to trap soot before the exhaust gases are exhausted to the environment. However, in the event that a DPF becomes cracked or otherwise damaged, some of the soot in the exhaust gas may find its way to the environment. In an effort to improve the containment of soot in diesel exhaust systems, it is desirable to know if and when undesirable soot is passing through the DPF. Some methods for sensing such a condition have employed pressure sensors, but these techniques may not be sensitive enough to meet more stringent environmental regulations.

Accordingly, there is a need in the art for a particulate sensor that overcomes these drawbacks.

BRIEF DESCRIPTION OF THE INVENTION

An embodiment of the invention includes a particulate sensor for sensing the presence of particulates in a gas flow stream. The particulate sensor includes a housing having a flow divider to provide a first flow path and a second flow path. A heater is disposed and configured to provide uniform heating of the two flow paths. A first temperature sensor is disposed in the first flow path downstream of the heater. A second temperature sensor is disposed in the second flow path downstream of the heater. A fine filter is disposed within the second flow path and is configured to trap carbonaceous particulates.

Another embodiment of the invention includes an exhaust system for a diesel powered vehicle. The exhaust system includes a diesel particulate filter (DPF) disposed to receive diesel exhaust, a particulate sensor disposed downstream of the DPF, and a control device disposed in signal communication with the particulate sensor. The particulate sensor is configured as set forth above. The control device is configured to provide an onboard diagnostics signal in response to a temperature differential sensed by the two temperature sensors exceeding a defined threshold.

BRIEF DESCRIPTION OF THE DRAWINGS

Referring to the exemplary drawings wherein like elements are numbered alike in the accompanying Figures.

DETAILED DESCRIPTION OF THE INVENTION

An embodiment of the invention provides a particulate sensor for use in a diesel exhaust system for sensing the presence of soot that may have leaked passed a diesel particulate filter located upstream in the exhaust system. In an embodiment, the particulate sensor has two flow paths configured to change the direction of flow depending on the soot content in the exhaust gas flow, to generate two equal temperature readings in the absence of soot content in the exhaust gas flow, and to generate two different temperature readings in the presence of soot content in the exhaust gas flow, thereby enabling a means for sensing the presence of soot in the gas flow.

Figure 1:
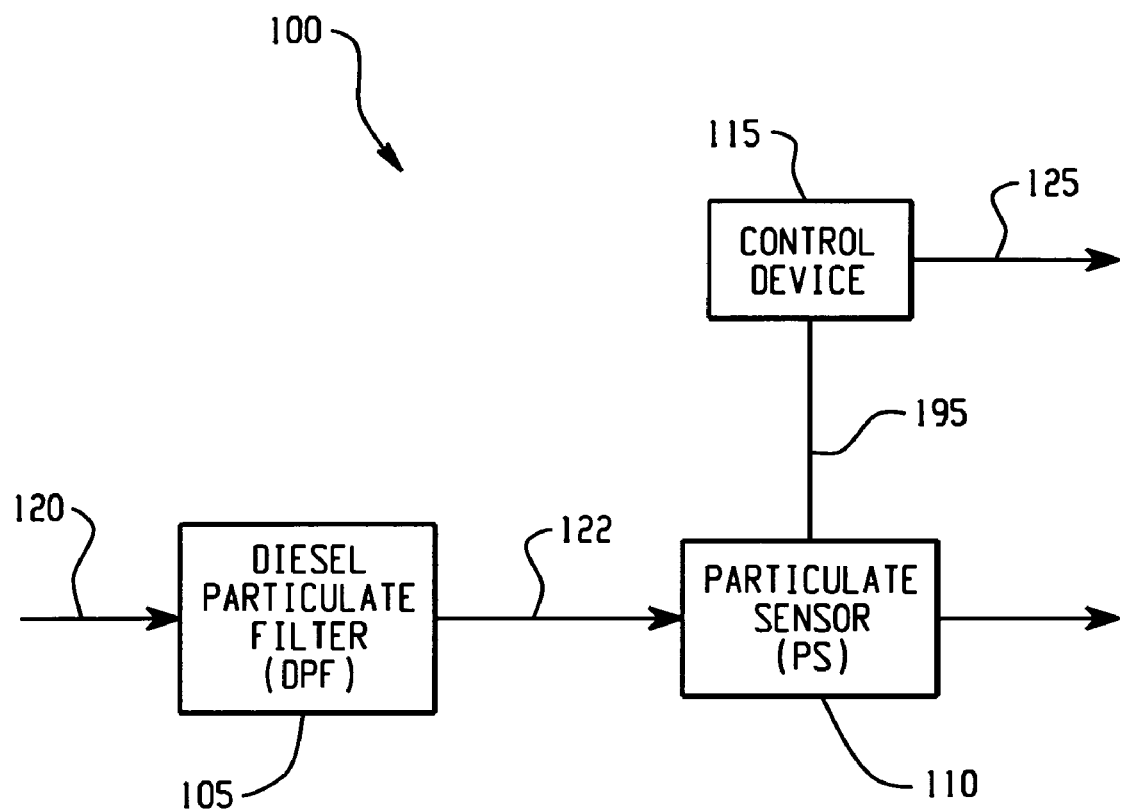
FIG. 1 depicts in block diagram form an exhaust system for use in accordance with an embodiment of the invention.

FIG. 1 is an exemplary embodiment of a diesel exhaust system 100 having a diesel particulate filter (DPF) 105, a particulate sensor (PS) 110 disposed downstream of the DPF 105, and a control device 115 in signal communication with the PS 110. The DPF 105 is disposed in the exhaust system 100 so as to receive diesel exhaust, illustrated by arrow 120, and to deliver filtered exhaust 122 to PS 110. Control device 115 is configured to receive temperature information from PS 110, and to produce an onboard diagnostic signal, represented by arrow 125, in the event that a temperature differential from PS 110 exceeds a defined threshold.

Figure 2:
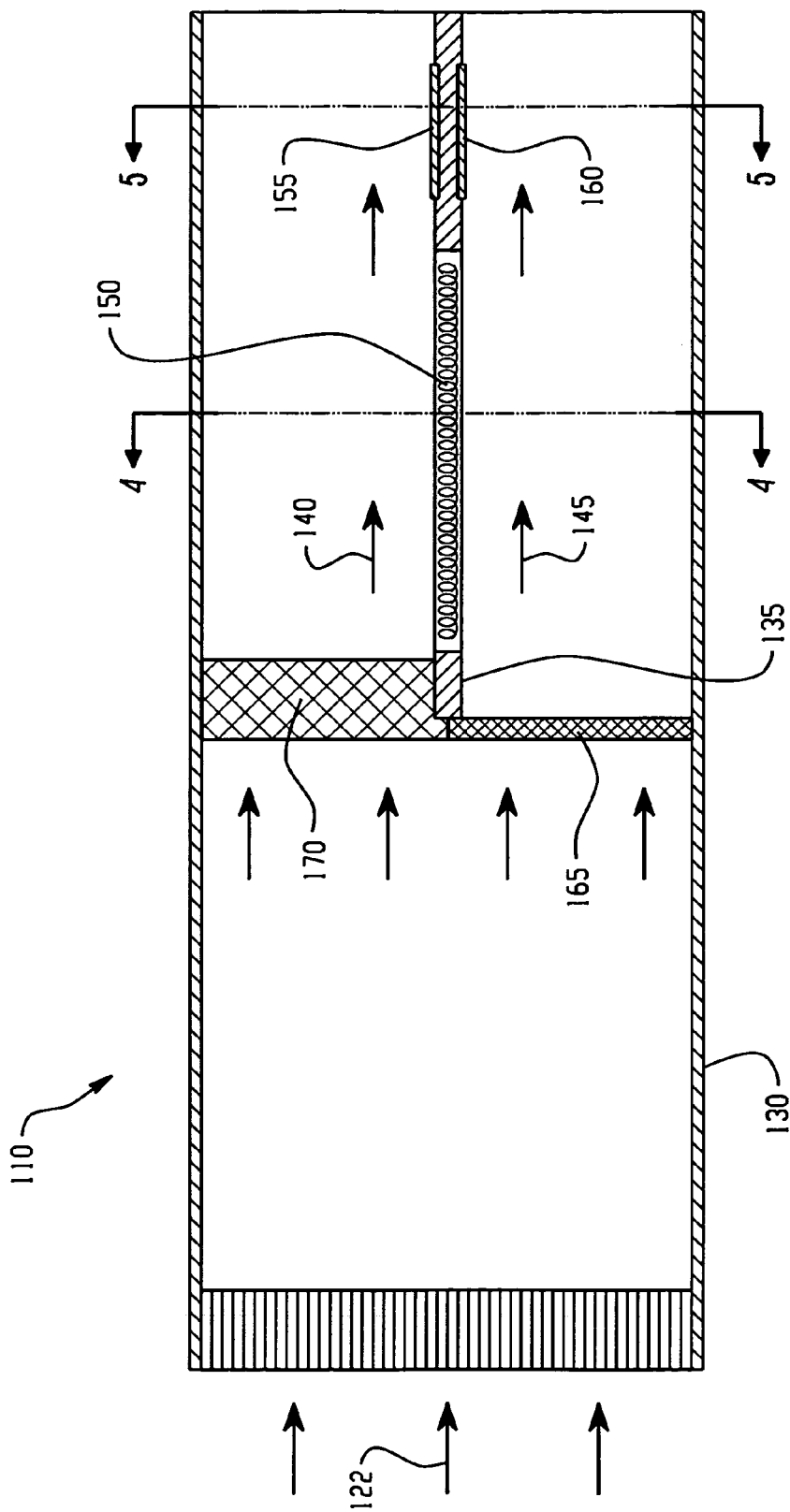
FIG. 2 depicts in schematic form a particulate sensor in accordance with an embodiment of the invention.

Referring now to FIG. 2, an embodiment of particulate sensor 110 is depicted in schematic view. A housing 130 with a flow divider 135 disposed therein provides for a first flow path 140 and a second flow path 145. A heater 150 is disposed and configured to provide uniform heating of the two flow paths 140, 145. In an embodiment, heater 150 is disposed at the flow divider 135. A first temperature sensor 155 is disposed in the first flow path 140 downstream of the heater 150, and a second temperature sensor 160 is disposed in the second flow path 145 downstream of the heater 150. A fine filter 165 is disposed within the second flow path 145 and is configured to trap carbonaceous particulates that may be present in the filtered exhaust gas flow stream 122.

In an embodiment, a coarse filter 170 is disposed within the first flow path 140 and is configured to provide a measurable flow restriction but to allow passage of carbonaceous particulates.

Figure 6:
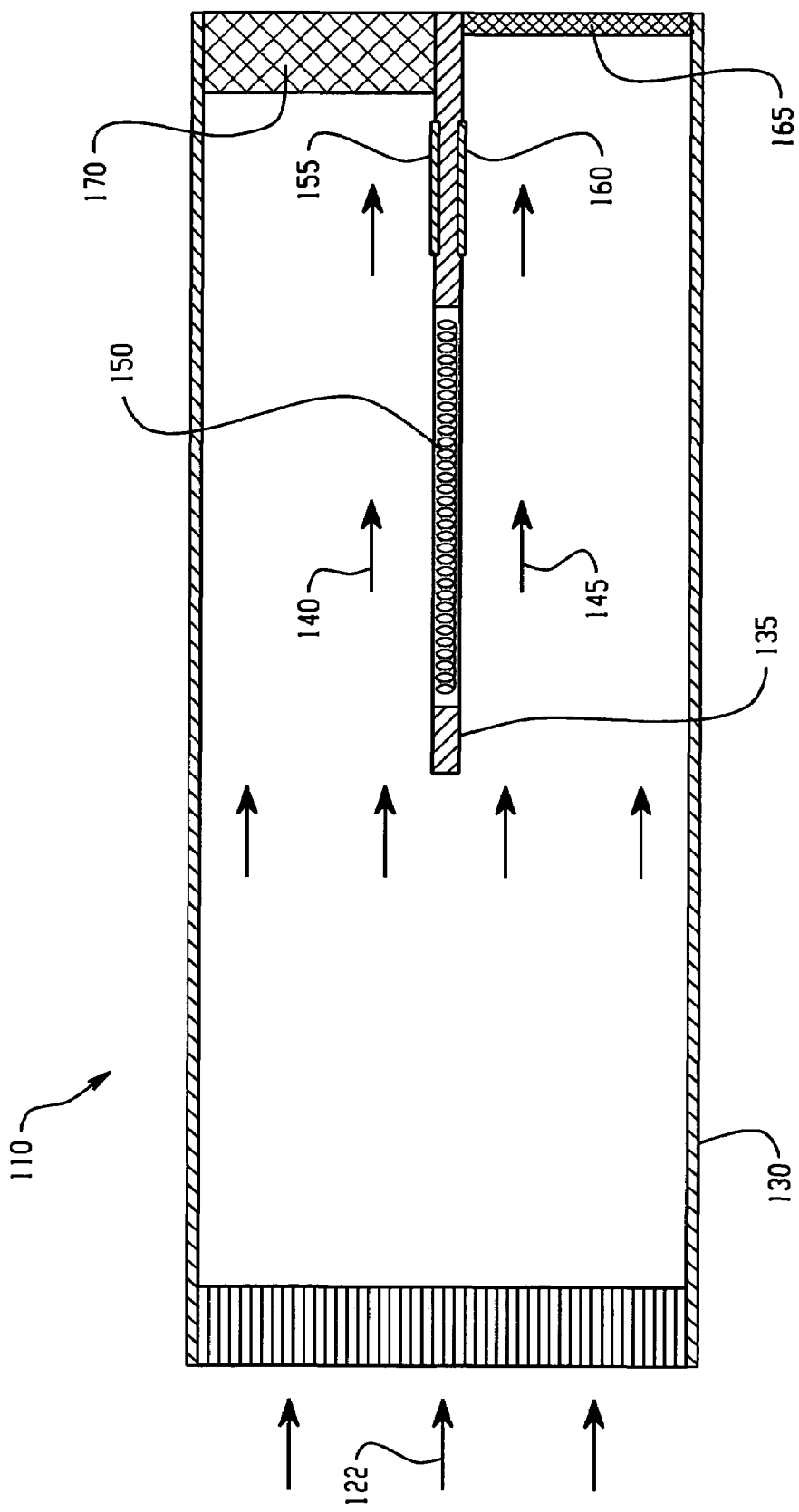
FIGS. 6 and 7 depict an alternative embodiment to the particulate sensor of FIGS. 2 and 3, respectively.
Figure 7:
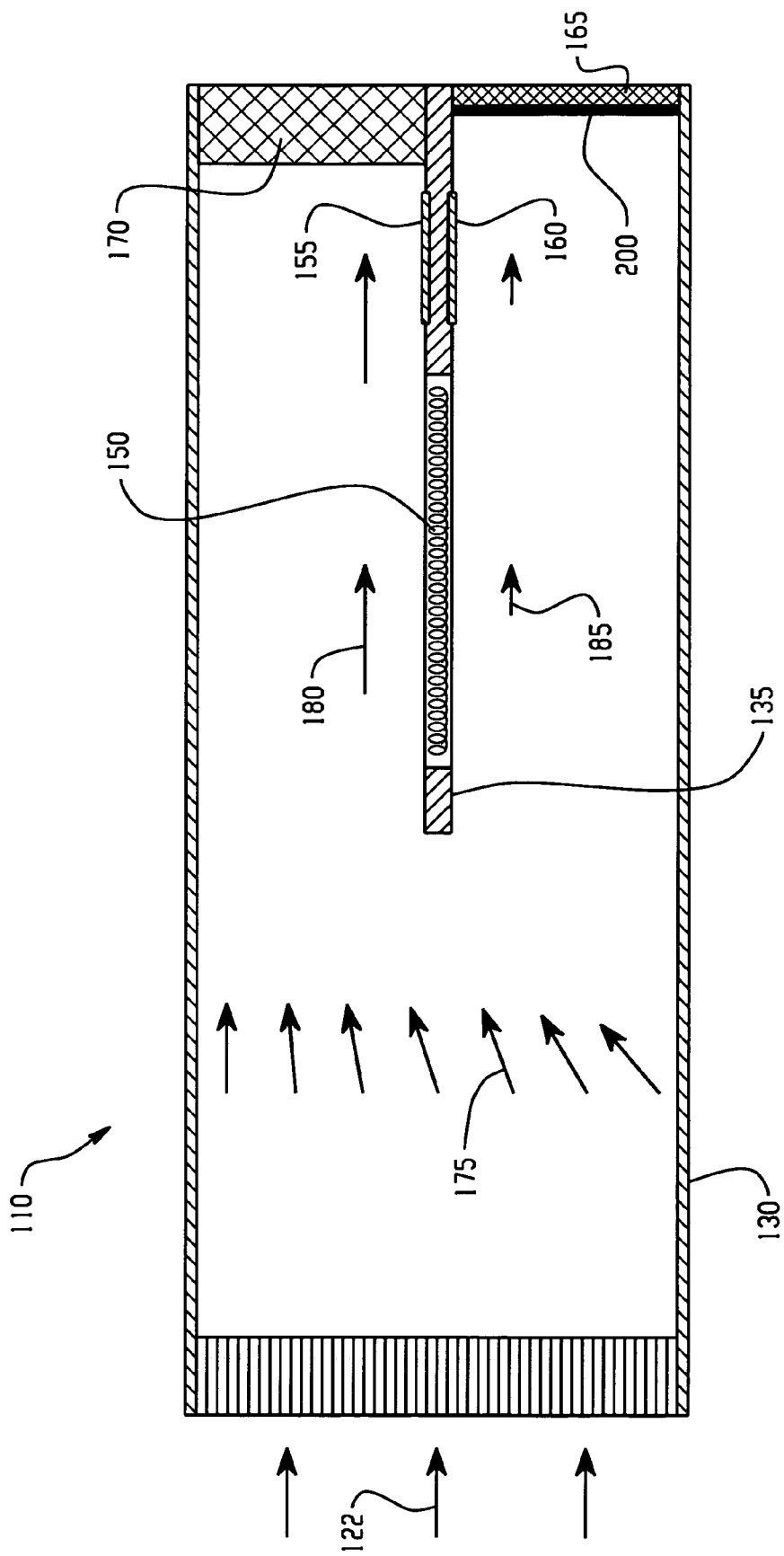

In an embodiment, the fine filter 165 is disposed proximate the entry of the second flow path 145, but may also be disposed proximate the exit of the second flow path 145, as depicted in FIG. 6 (with clean filters) and FIG. 7 (with soot on fine filter).

In an embodiment, the coarse filter 170 is disposed proximate the entry of the first flow path 140, but may also be disposed proximate the exit of the first flow path 145, as also depicted in FIGS. 6 and 7.

The thicknesses of the coarse 170 and fine 165 filters are sized to provide equal flow restriction in the first and second flow paths 140, 145, respectively, in the absence of any trapped carbonaceous particulates at the fine filter 165, thereby enabling the particulate sensor 110 to be calibrated. While it may not be necessary to include a coarse filter 170 in particulate sensor 110, the use of a coarse filter 170 enables ease of calibration of the particulate sensor 110.

In response to an absence of carbonaceous particulates in the gas flow stream 122, equal flow is present in the two flow paths 140, 145, and heater 150 uniformly heats the gases therein. As such, the temperature sensed by the first temperature sensor 155 is equal to the temperature sensed by the second temperature sensor 160.

In response to the presence of carbonaceous particulates in the gas flow stream 122, soot particles are filtered out by the fine filter 165 but not the coarse filter 170, thereby restricting the flow through the fine filter 165 and causing more flow to pass through the coarse filter 170. As such, the first flow path 140 will have a greater flow than the second flow path 145, resulting in the temperature sensed by the first temperature sensor 155 being greater than the temperature sensed by the second temperature sensor 160.

A consequence of the fine filter 165 clogging with soot and the coarse filter 170 not, is that the resulting difference in the temperatures sensed by the first and second temperature sensors 155, 160 is a function of the soot content in the gas flow stream 122. By monitoring for this temperature difference, a determination may be made as to whether the DPF 105 is leaking soot or not.

Figure 3:
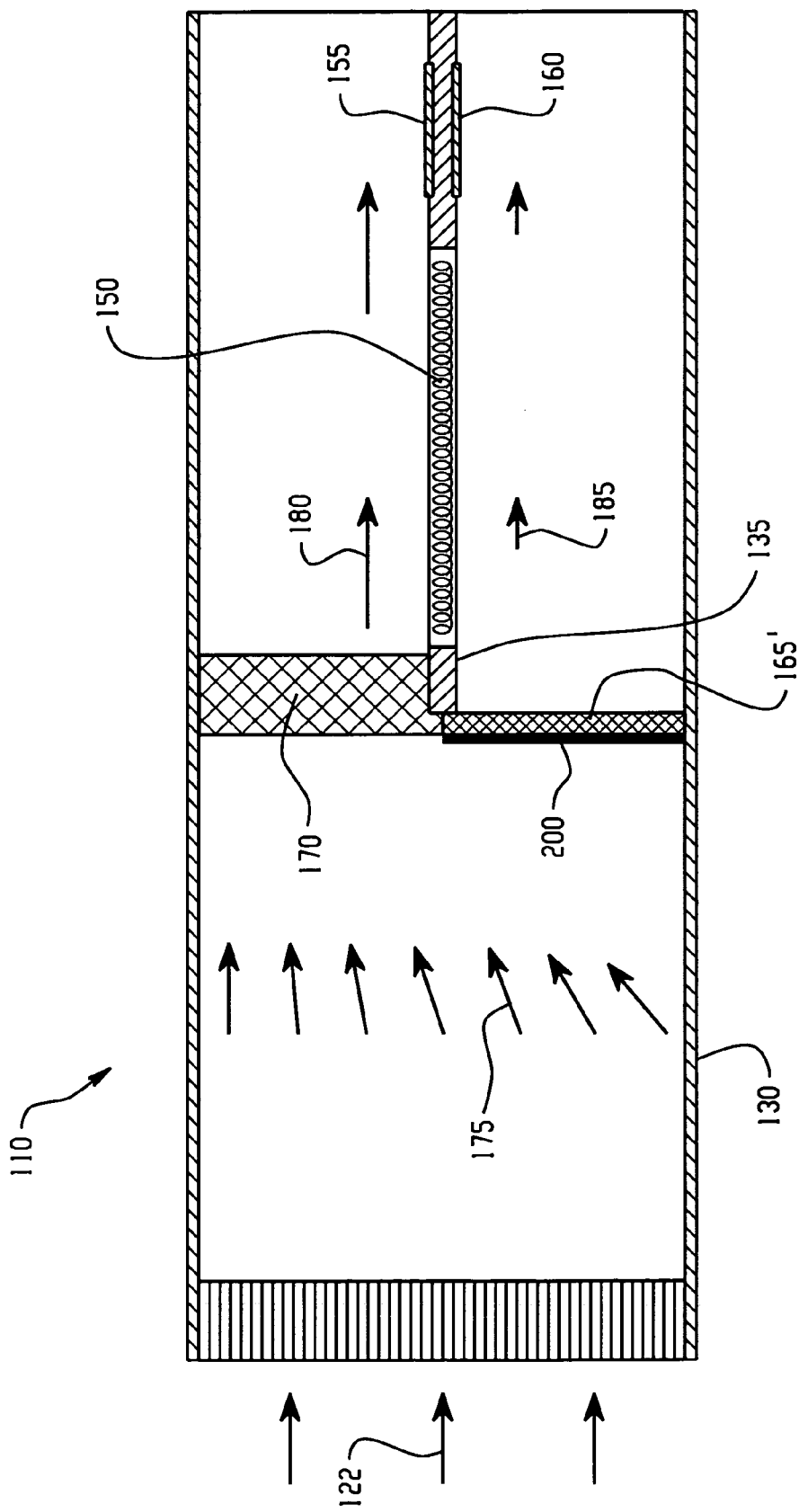
FIG. 3 depicts the particulate sensor of FIG. 2 with a different gas flow pattern.

FIG. 3 illustrates a change in flow direction, arrows 175, as a result of a clogged or partially clogged fine filter 165' (a layer of soot 200 is illustrated by a solid black vertical line). Long arrows 180 and short arrows 185 illustrate greater flow in the first flow path 140 as compared to the second flow path 145.

Figure 4:
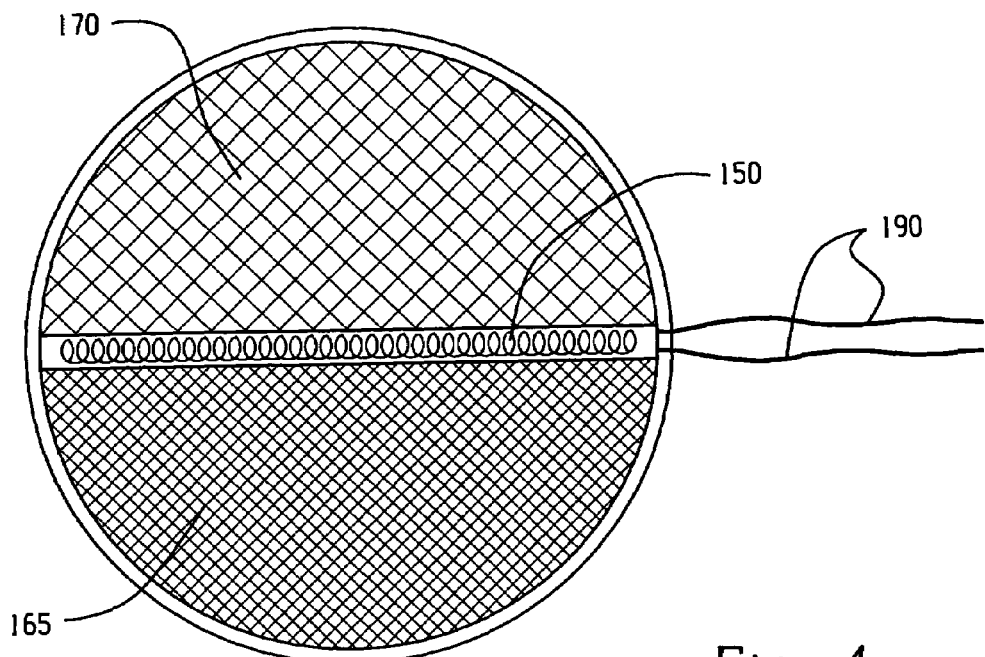
FIG. 4 depicts a cross section view of a portion of the particulate sensor of FIG. 2.

In an embodiment, heater 150 is a hot-film heater, similar to what may be employed in a hot-film air-mass meter, and has electrical leads 190, best seen by referring to FIG. 4, for the energization thereof. However, it will be appreciated that any heater suitable for the purposes disclosed herein may be employed in particulate sensor 110.

Figure 5:
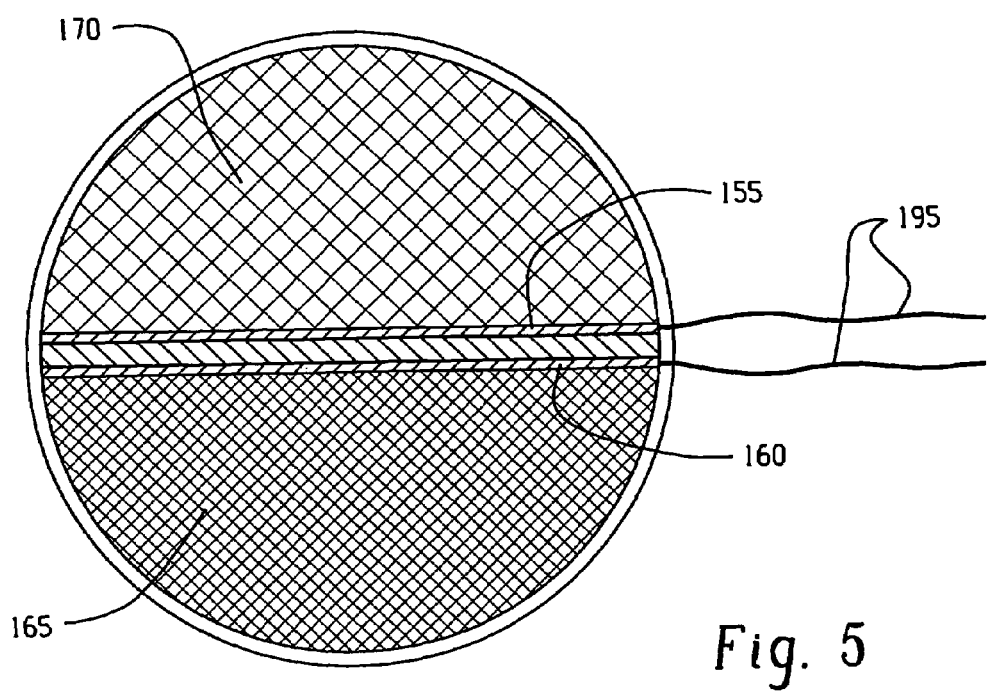
FIG. 5 depicts another cross section view of a portion of the particulate sensor of FIG. 2.

The communication path 195 between temperature sensors 155, 160 and control device 115, is illustrated in both FIGS. 1 and 5. In an embodiment, the control device 115 is configured to provide an onboard diagnostics signal 125 in response to a temperature differential sensed by the two temperature sensors 155, 160 exceeding a defined threshold.

As discussed previously and illustrated in FIGS. 6 and 7, coarse and fine filters 170, 165 may be disposed proximate the exit of each respective flow path 140, 145.

A result of using an embodiment of the invention is the unexpected advantage of not only being able to detect a low level presence of soot in an exhaust gas flow, but also being able to establish a relationship between the temperature differential sensed and the amount of soot in the exhaust gas flow.

As disclosed, some embodiments of the invention may include some of the following advantages: the ability to meet EPA regulations requiring that all emission related devices be equipped with onboard diagnostics capability; the ability to detect a low level of particulate emissions on the downstream side of the DPF; the ability to generate a signal that is proportional to the amount of soot deposited on the fine filter, and therefore the amount of soot present in the gas flow stream downstream of the DPF; the ability to define a threshold temperature differential for triggering an onboard diagnostics signal; and, the design flexibility of being able to place the coarse and fine filters anywhere in the first and second flow paths.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A particulate sensor for sensing the presence of particulates in a gas flow stream, the particulate sensor comprising:
   a housing having a flow divider to provide a first flow path and a second flow path;
   a heater disposed and configured to provide uniform heating of the two flow paths;
   a first temperature sensor disposed in the first flow path downstream of the heater;
   a second temperature sensor disposed in the second flow path downstream of the heater; and
   a fine filter disposed within the second flow path, the fine filter configured to trap carbonaceous particulates.

2. The particulate sensor of claim 1, wherein the fine filter is disposed proximate the entry of the second flow path.

3. The particulate sensor of claim 1, wherein the fine filter is disposed proximate the exit of the second flow path.

4. The particulate sensor of claim 1, further comprising:
   a coarse filter disposed within the first flow path, the coarse filter configured to provide a measurable flow restriction but to allow passage of carbonaceous particulates.

5. The particulate sensor of claim 4, wherein the coarse filter is disposed proximate the entry of the first flow path.

6. The particulate sensor of claim 4, wherein the coarse filter is disposed proximate the exit of the first flow path.

7. The particulate sensor of claim 1, wherein the heater is disposed at the flow divider.

8. The particulate sensor of claim 4, wherein:
   the thicknesses of the coarse and fine filters are sized to provide equal flow restriction in the first and second flow paths, respectively, in the absence of any trapped carbonaceous particulates.

9. The particulate sensor of claim 1, wherein:
   in response to an absence of carbonaceous particulates in the gas flow stream, the temperature sensed by the first temperature sensor is equal to the temperature sensed by the second temperature sensor.

10. The particulate sensor of claim 1, wherein:
    in response to the presence of carbonaceous particulates in the gas flow stream, the temperature sensed by the first temperature sensor is greater than the temperature sensed by the second temperature sensor.

11. The particulate sensor of claim 1, wherein:
    the difference in the temperatures sensed by the first and second temperature sensors is a function of the soot content in the gas flow stream.

12. The particulate sensor of claim 1, wherein:
    in response to the presence of carbonaceous particulates in the gas flow stream, the gas flow in the second flow path is less than the gas flow in the first flow path.

13. The particulate sensor of claim 1, wherein:
    the heater is a hot-film heater.

14. The particulate sensor of claim 1, wherein:
the first and second flow paths have equal restriction to flow.

15. An exhaust system for a diesel powered vehicle, comprising:
 a diesel particulate filter (DPF) disposed to receive diesel exhaust;
 a particulate sensor disposed downstream of the DPF, and
 a control device disposed in signal communication with the particulate sensor;
 wherein the particulate sensor comprises: a housing having a flow divider to provide a first flow path and a second flow path; a heater disposed and configured to provide uniform heating of the two flow paths; a first temperature sensor disposed in the first flow path downstream of the heater; a second temperature sensor disposed in the second flow path downstream of the heater; and a fine filter disposed within the second flow path, the fine filter configured to trap carbonaceous particulates; and
 wherein the control device is configured to provide an onboard diagnostics signal in response to a temperature differential sensed by the two temperature sensors exceeding a defined threshold.

* * * * *